March 3, 1942.  F. W. SCHWINN  2,274,747
CUSHIONED HANDLE BAR FOR BICYCLES
Filed May 23, 1940
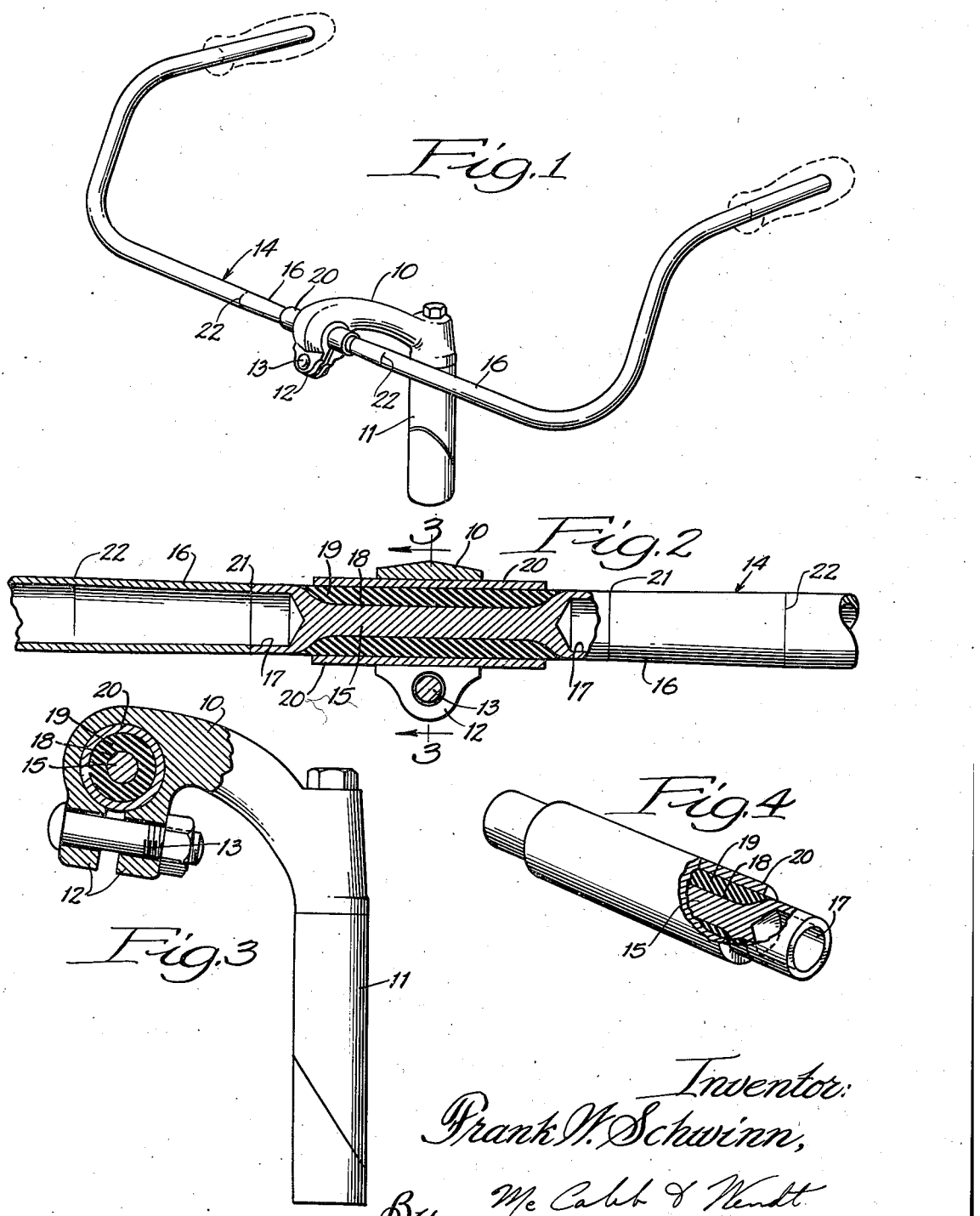

Patented Mar. 3, 1942

2,274,747

UNITED STATES PATENT OFFICE 2,274,747

CUSHIONED HANDLE BAR FOR BICYCLES

Frank W. Schwinn, Chicago, Ill.

Application May 23, 1940, Serial No. 336,689

9 Claims. (Cl. 74—551.2)

My invention relates to cushioned handle bars for bicycles, the purpose being to insulate the riders' hands against vibrations picked up from the road and transmitted through the front wheel. My cushioning is preferably interposed at the point where the handle bar is mounted on the extension clamp of the steering post.

One object of my invention is to make the cushioning effective not only against vertical vibrations, but also against vibrations in other directions, such as those transverse to the vertical longitudinal plane of the bicycle and those tending to rock the handle bar about its mounting in the extension clamp. Especially in the lightweight bicycles where the cushioning effect of balloon tires is not available, the practice, heretofore proposed, of interposing a rubber cushion between the steering post and the handle bar has not been adequate for the comfort of the rider's hands because the cushioning, to the extent it was available, acted only on up and down vibrations from the road. There are many instances where a front tire will hit the side of a stone and give a transverse vibration. Or, the tire may be given an oblique movement which has a substantial transverse component as well as vertical component. I propose to make the cushioning more fully effective by absorbing road jolts or vibrations in all directions. In addition to insulating against vertical and transverse shocks, my invention affords a resilient or cushioned universal mounting for the handle bar in the extension whereby the handle bar has limited resilient rocking and rotation in the extension.

Another object of the invention is to incorporate the cushioning feature at the region where the handle bar is mounted in the steering post extension, without substantial change in the conformation, appearance, and overall dimensions of the parts.

Still another object is to enclose the major portion of the cushioning member and to prevent its being locally pinched by the tightening of the clamp of the steering post extension.

My invention is also concerned with an improved method of manufacture.

The foregoing, together with further objects, features and advantages of my invention, are set forth in the following description of a specified embodiment thereof, and in the accompanying drawing wherein:

Fig. 1 is a perspective view of a handle bar mounted, according to my invention, in a bicycle steering post;

Fig. 2 is a plan section of the medial portion of the handle bar and its mounting;

Fig. 3 is a vertical section taken on the line 3—3 of Fig. 2; and

Fig. 4 is a perspective view of the ferruled central section of the handle bar as it appears before the handle bar is completed and mounted in the steering post extension.

In the drawing, I have illustrated a so-called gooseneck comprising an extension 10 carried by the steering post 11. The forward end of the extension 10 incorporates a split clamp 12 tightened by a bolt 13. The handle bar 14, which as usual is generally U-shaped in plan, is preferably, for the incorporation of my invention, formed in three sections: a short central section 15 formed of solid stock and L-shaped pieces 16 formed of tubular stock.

At its ends, the central section 15 has the same outside diameter as the tubular stock of the pieces 16. The ends of the center section are counterbored, as at 17, to present ends with annular walls of thickness approximately that of the thickness of the tubular stock of the handle bar pieces 16. Intermediate its ends, the section 15 is of substantially fixed diameter to form a core 18. Preferably the core 18 merges into the ends of the center section by an ogee profile curve rather than by an abrupt shoulder.

A sleeve 19 of vulcanized rubber, or like resilient cushioning material, surrounds the core 18 in contact therewith. The outer surface of the rubber sleeve 19, in its unvulcanized state, is a straight cylindrical surface of the same diameter as the ends of the section 15 and the handle bar pieces 16. For convenience in mounting, the sleeve 19 may be radially or diametrically split. A straight tubular ferrule 20 is slipped over one end of the center section and over the sleeve 19 and positioned with its ends falling short of contact with the ends of the center section 15. The three pieces 15, 19 and 20, thus assembled, are then permanently secured together as the unit of Fig. 4 by vulcanizing the rubber. The surface of the core 18 and the inner surface of the ferrule 20 are preferably left somewhat rough to facilitate the rubber, in vulcanizing, to become securely bonded to the metal.

The radially or diametrically split surfaces of the vulcanized rubber will, upon vulcanizing, be joined together so that the rubber sleeve is, for practical purposes, unsplit.

The assembled unit of Fig. 4 being relatively short is easily handled in subjecting it to vulcanizing heat. It is much more convenient to handle in vulcanizing if the vulcanizing is done before the handle bar pieces 16 are attached.

After the unit of Fig. 4 is vulcanized, the handle bar pieces 16 are placed in a suitable welding fixture with the inner ends of the handle bar pieces 16 in registering abutment with the counterbored ends of the center section 15, and flash welded thereto, as indicated at 21. After dressing the flash welding, as may be required, the completely assembled handle bar may be plated.

When the handle bar is to be assembled on the bicycle, it is threaded through the eye in the steering post extension 10 until the ferrule 20 is centered in the extension, and then the clamping bolt 13 is tightened to secure the split clamp upon the ferrule.

The use of the ferrule 20 has many advantages. It serves as a protective cover for all of the rubber sleeve 19, except a little of the rubber which is exposed at its ends. The ferrule 20 is of definitely controlled uniform diameter, which permits the handle bar to be threaded into place with a minimum enlargement of the clamping eye of the extension 10 over its clamped position. If the rubber sleeve 19 were directly to engage the clamping eye, provision would have to be made for greater clearance, and the clamping eye would have to be made with a longer axis. The ferrule 20 distributes the pressure on the rubber sleeve over a large area, and thereby prevents cutting into the rubber. Somewhat similarly, the ferrule 20 prevents pinching of the rubber at the slot of the clamp when it is tightened. The ferrule 20 to which the rubber is bonded requires that the rubber resiliently flow when the handle bar is rocked about the axis of the clamping eye, whereas if it were directly engaged by the clamping eye, it could not be bonded thereto and would slip in the eye unless it were excessively compressed by the clamp, and then the clamp would have to be of the two-piece or hinge type.

By having the length of the resilient sleeve 19 and the ferrule 20 substantially greater than the axial length of the eye of the clamp 12, as for example, on the order of three times as long, the shock absorbing qualities of the cushion are substantially improved over what they would be if the sleeve, ferrule and eye length were the same. This is so because the cushion is spread over a greater area between the relatively movable handle bar and the ferrule which is held rigid at its center by the clamp. Another advantage of this greater sleeve and ferrule length, and thus greater effective cushioning area, is that the resilient sleeve may be reasonably thin, and thinner than would be required if the sleeve were shorter, while yet obtaining satisfactory cushioning results.

In use, any vertical jolt—up or down—suffered by the front wheel of the bicycle and imparted to the steering post extension is largely absorbed by compression of the rubber in the sleeve 19, which is interposed between the handle bar and the ferrule clamped in the extension. If the jar suffered by the wheel is lateral or oblique, the lateral thrust (or the lateral component of the oblique thrust, as the case may be) and transmitted to the steering post extension, is absorbed by the rubber as a relative axial movement between the handle bar and the clamped ferrule 20. In addition, the handle bar may, under the resiliency of the rubber, rock about any diameter of the handle bar passing through the axis of the center section 15. The center section 15 of the handle bar may also rotate about its own axis in reference to the clamped ferrule 20, against the resilience of the rubber. This is important because the up and down shocks suffered by the wheel and otherwise imparted to the handle bar would be most fatiguing to the rider's hands. I thus do not rely merely on the relative vertical movement of the center section 15 and the clamped ferrule 20 to absorb these up and down shocks, but I permit them to be absorbed in part by the rotation of the handle bar in the extension 10.

In previous proposals to give the handle bar a cushioned mounting in the steering post extension, the construction and arrangement have been such that special clamping eyes have had to be employed and the conformation of the handle bar and its mounting has been greatly enlarged. One outstanding merit of my cushioned mounting is that the general appearance remains substantially the same as in standard uncushioned constructions and the size at the region of the mounting is not increased. In face, the same steering post extension and clamping eye may be employed, since they usually co-operate with a clamping seat on the handle bar of slightly larger diameter than the remainder of the handle bar (in order that the handle bar can be threaded through the clamping eye). My ferrule 20 provides such a seat.

I call attention to an expedient which I preferably employ whereby I am enabled to form the handle bar of tubular stock of standard diameter, to use a steering post clamping eye of standard inside diameter, to avoid a step or shoulder where the center section joins the side pieces of the handle bar—and yet have the wall of the ferrule sufficiently thick for adequate strength. Since the ferrule must slip over one end of the central section, if the diameter of the end of the central section were the same diameter as the standard handle bar tubing, the thickness of the wall of the ferrule could be only half the increased diameter of the usual clamping seat on the handle bar, in order to fit the standard clamping eye of the steering post. This might not give the wall of the ferrule adequate thickness to avoid danger of its being bent in use. To solve this problem, I slightly taper the side pieces 16 of the handle bar from the points 22 to their inner ends. The inner ends of the handle bar side pieces 16 and the ends of the center section 15, which are of the same diameter, are thus of slightly less diameter than the diameter of the tubular handle bar stock. Thereby, the ferrule may have a slightly smaller bore with an attendant increase in the thickness of its wall. The outside diameter of the ferrule thus remains the same as the diameter of the standard clamping seat on an ordinary handle bar. This tapering of the handle bar pieces 16 toward their ends may be accomplished, prior to the welding, by a contractive spinning, drawing, or like operation.

While I have thus described and illustrated a specific embodiment of my invention, I contemplate that changes and substitutions may be made without departing from the scope or spirit of my invention.

I claim:

1. A handle bar assembly comprising a handle bar formed by a central section formed from solid stock and side pieces formed from tubular stock and butt welded at their inner ends to and in register with the ends of the center section, the ends of the center section being counterbored to present short tubular ends of thickness and outside diameter substantially the same as the inner ends of the handle bar pieces, the center section, intermediate its ends, being of reduced diameter to form a rod-like core, a rubber sleeve surrounding the core and having an outside diameter substantially the same as the diameter of the ends of the center section, and a ferrule having a bore of substantially the diameter of the ends of the center section and surrounding the sleeve but out of contact with the center section, the rubber being vulcanized to the core and to the ferrule substantially throughout their lengths, and the outer surface of the ferrule being formed to be received in, and clamped by, the clamping eye of a bicycle steering post.

2. A handle bar assembly, according to claim 1, in which the lengths of the ferrule and sleeve are in the order of three times the axial length of the standard clamping eye of a bicycle steering post adapted to receive and clamp the ferrule.

3. A bicycle handle bar assembly comprising an integral handle bar having a mid region of reduced diameter, a ferrule having a bore of a size approximating the diameter of the handle bar, and a resilient cushioning sleeve interposed in the space between the ferrule and the reduced portion of the handle bar normally to hold the ferrule out of contact with the handle bar, the ferrule being constructed and arranged to be received in and clamped by the eye of a gooseneck.

4. A bicycle handle bar assembly comprising a handle bar having three sections, namely, a center section and tubular side pieces butt welded to the respective ends of the center section, the center section, intermediate its ends, being of reduced diameter to form a central core, a rubber sleeve surrounding the core to the diameter of the ends of the center section, and a ferrule surrounding the sleeve and spaced out of contact with the handle bar by the sleeve, the outer diameter of the ferrule being of a standard size to fit the standard clamping eye of the bicycle steering post and its inner diameter being of approximately the outside diameter of the ends of the center section but arranged to slip thereover in assembly, the ends of the center section being of slightly less diameter than the tubular stock of the handle bar and the center pieces of the handle bar, adjoining their inner ends, being tapered down to conform to the diameter of the ends of the center section, the tubular stock of the side pieces of the handle bar, throughout the greater portion of their length, being of an outside diameter greater than the bore of the ferrule but less than the outside diameter of the ferrule.

5. The method of making a bicycle handle bar and mounting it in the clamping eye of a bicycle steering post to absorb relative movement between the clamping eye and the handle bar, which consists in forming from solid stock a center section of the handle bar with counterbored enlarged ends and a reduced center portion, surrounding the reduced center portion with a rubber sleeve, slipping a tubular ferrule over one end of the center section to embrace the sleeve and to be spaced from the center section by the sleeve, heat treating the center section, rubber sleeve and ferrule as a subassembly unit to vulcanize the rubber and thereby bond the sleeve to the core and to the ferrule, thereafter bringing side pieces of the handle bar, formed from tubular stock, into abutting register with the ends of the center section and there butt welding them to the center section, and thereafter threading one end of the handle bar through the clamping eye to seat the ferrule within the clamping eye and there clamping the eye upon the ferrule.

6. A handle bar assembly comprising a handle bar having a reduced diameter at its mid region, a resilient rubber cushioning sleeve surrounding said mid region and being of substantially the same diameter as the handle bar at opposite sides of said mid region, the rubber of the sleeve being bonded to the handle bar mid region over a considerable area of contact, and a ferrule having a bore of substantially the diameter of the handle bar, said ferrule surrounding said sleeve and being externally conformed to be received in and clamped by the clamping eye of a bicycle steering post.

7. A handle bar assembly comprising a handle bar having a reduced diameter mid region, a resilient rubber cushioning sleeve surrounding said reduced diameter mid region and being of substantially the same diameter as the diameter of the handle bar beyond said mid region, the rubber of the sleeve being bonded to the handle bar, and a ferrule structure, having an internal diameter of substantially the diameter of the handle bar, embracing said sleeve and being externally conformed to be received in and clamped by the clamping eye of a bicycle steering post, said sleeve spacing the ferrule structure from any contact with the handle bar.

8. A handle bar assembly comprising an integral handle bar which, on either side of its central region, is formed of tubular metal stock extending from the center region in alignment therewith and of an external diameter and formation to permit ready threading thereof through the clamping eye of a standard bicycle steering post, the center region providing a core of reduced diameter, a sleeve of resilient cushioning material surrounding the core, and a ferrule circumferentially embracing the sleeve and spaced by the latter from contact with the handle bar, whereby, through the resiliency of the sleeve, the handle bar may have an appreciable movement in all directions relative to the ferrule, the outer surface of the ferrule being of a diameter slightly larger than said external diameter of the side portions of the handle bar and approximately the diameter of a standard handle bar clamping seat so as to be received in and clamped by a standard diameter clamping eye.

9. A handle bar assembly comprising a handle bar, a resilient cushioning sleeve surrounding the handle bar at its mid region, and a ferrule structure surrounding the sleeve, said ferrule structure being externally conformed to be received in and rigidly clamped by the clamping eye of a standard bicycle steering post, said sleeve and ferrule structure being substantially longer than the axial length of the clamping eye and projecting to opposite sides of the clamp so as to distribute the cushioning effect of the sleeve over a greater area of the handle bar than the area encircled by the clamping eye.

FRANK W. SCHWINN.